United States Patent
Shih et al.

(10) Patent No.: US 9,152,791 B1
(45) Date of Patent: Oct. 6, 2015

(54) REMOVAL OF FAKE ANTI-VIRUS SOFTWARE

(75) Inventors: Ming-Chang Shih, Taipei (TW); Ping Ju Kuo, Taipei (TW); Shuang-Fu Han, Taipei (TW)

(73) Assignee: Trend Micro Inc., Tokyo (JP)

( * ) Notice: Subject to any disclaimer, the term of this patent is extended or adjusted under 35 U.S.C. 154(b) by 141 days.

(21) Appl. No.: 13/105,496

(22) Filed: May 11, 2011

(51) Int. Cl.
*G06F 21/56* (2013.01)
*G06F 21/51* (2013.01)

(52) U.S. Cl.
CPC .............. *G06F 21/566* (2013.01); *G06F 21/51* (2013.01); *G06F 21/56* (2013.01); *G06F 21/568* (2013.01)

(58) Field of Classification Search
CPC ....... G06F 21/51; G06F 21/56; G06F 21/566; G06F 21/568
USPC .......................................................... 726/24
See application file for complete search history.

(56) References Cited

U.S. PATENT DOCUMENTS

| | | | |
|---|---|---|---|
| 6,367,012 B1* | 4/2002 | Atkinson et al. | 713/176 |
| 6,944,775 B2* | 9/2005 | Barton et al. | 713/188 |
| 7,055,175 B1* | 5/2006 | Le Pennec et al. | 726/24 |
| 7,107,618 B1* | 9/2006 | Gordon et al. | 726/24 |
| 7,568,233 B1* | 7/2009 | Szor et al. | 726/25 |
| 7,694,340 B2* | 4/2010 | Raman et al. | 726/24 |
| 7,861,252 B2* | 12/2010 | Uszok et al. | 719/317 |
| 8,015,284 B1* | 9/2011 | Isenberg et al. | 709/224 |
| 8,056,115 B2* | 11/2011 | Treinen | 726/1 |
| 8,131,655 B1* | 3/2012 | Cosoi et al. | 706/12 |
| 8,161,548 B1* | 4/2012 | Wan | 726/22 |
| 8,274,968 B2* | 9/2012 | Rosenberg et al. | 370/353 |
| 8,479,289 B1* | 7/2013 | Krishnappa | 726/23 |
| 8,499,150 B1* | 7/2013 | Nachenberg | 713/158 |
| 8,578,496 B1* | 11/2013 | Krishnappa | 726/24 |
| 2002/0042886 A1* | 4/2002 | Lahti et al. | 713/201 |
| 2005/0155031 A1* | 7/2005 | Wang et al. | 717/170 |
| 2006/0005148 A1* | 1/2006 | Cheng et al. | 715/808 |
| 2007/0083938 A1* | 4/2007 | Aoki et al. | 726/30 |
| 2007/0289019 A1* | 12/2007 | Lowrey | 726/24 |
| 2008/0010538 A1* | 1/2008 | Satish et al. | 714/38 |
| 2009/0222907 A1* | 9/2009 | Guichard | 726/17 |

(Continued)

OTHER PUBLICATIONS

Running Scared: Fake Security Software Rakes in Money Around the World; François Paget; McAfee® Labs™; 2010.*

(Continued)

*Primary Examiner* — James Turchen
(74) *Attorney, Agent, or Firm* — Beyer Law Group LLP (57) ABSTRACT

Lists of keywords by type are collected that are associated with fake antivirus software. One more rules are created including the keywords that likely indicate fake antivirus software. The keywords and rules are stored in a local database on a computer. Each executing process of a computer is scanned using the rules. A match indicates that the scanned process is likely fake antivirus software. A check is then performed to determine if the scanned process is actually legitimate antivirus software (using a digital certificate, a white list, or a call to a function). If the check fails a determination is made that the identified process is fake antivirus software. The process may then be displayed, cleaned, quarantined, or permanently removed from the computer. The cursor may be dragged into the window of an executing process in order to selectively scan that process only. Or, any number of executing processes may be selected to be scanned by the rules. A log function allows a computer user to view a history of actions taken by the above technique.

24 Claims, 8 Drawing Sheets

(56) References Cited

U.S. PATENT DOCUMENTS

| | | | |
|---|---|---|---|
| 2010/0186088 A1* | 7/2010 | Banerjee et al. | 726/23 |
| 2010/0251371 A1* | 9/2010 | Brown | 726/23 |
| 2011/0083186 A1* | 4/2011 | Niemela et al. | 726/24 |
| 2011/0219448 A1* | 9/2011 | Sreedharan et al. | 726/23 |
| 2011/0246936 A1* | 10/2011 | Stahlberg | 715/809 |
| 2012/0002839 A1* | 1/2012 | Niemela et al. | 382/100 |
| 2012/0066346 A1* | 3/2012 | Virmani et al. | 709/219 |
| 2012/0090025 A1* | 4/2012 | Milner et al. | 726/22 |
| 2012/0151582 A1* | 6/2012 | Reasor et al. | 726/23 |
| 2012/0159620 A1* | 6/2012 | Seifert et al. | 726/22 |

OTHER PUBLICATIONS

Effective Whitelisting for Filesystem Forensics; Sudarshan Chawathe; ISI 2009, Jun. 8-11, 2009, Richardson, TX, USA; IEEE.*

Using Ad-Aware 2007 Free to remove Spyware & Hijackers from Your Computer; Lawrence Abrams; Feb. 27, 2012, http://www.bleepingcomputer.com/tutorial/use-ad-aware-2007-to-remove-spyware/ accessed May 15, 2014.*

Detecting Scareware by Mining Variable Length Instruction Sequences; Raja Khurram Shahzad et al.; IEEE; Information Security South Africa (ISSA), Aug. 2011.*

Does Symantec Endpoint Protection protect me from fake anti-virus programs; article: http://www.symantec.com/docs/TECH122898; Created Jan. 1, 2010.*

The Nocebo Effect on the Web: An Analysis of Fake Anti-Virus Distribution; Moheed Abu Rajab et al.; Dec. 2010.*

* cited by examiner

FIG. 1

Fake Antivirus Software Screen Shot

Vender Information 30

XP AntiMalware 2010 : Unregistered Version

XP AntiMalware 2010 — 34

Support | Registration

Main

Current PC State: Infected!

None

Malware database status: ☑ Up to date

Total: 27,282

Perform Scan

Internet Security

Personal Security 42

Proactive Defense

Firewall

Configuration

| File | Malware Name |
|---|---|
| ☐ C:\Program Files\Common files\Microsoft...\eHm42U0.cab | Trojan-Spy.HTML.Bankfraud |
| ☐ C:\Program Files\Internet Explorer\PL...\H6Cx561HEq7.sys | Trojan-Proxy.Win32.Agent.x |
| ☐ C:\Program Files\microsoft frontpage\5DUY4D.dl 24 | Email-Worm.VBS.Peach |
| ☐ C:\WINDOWS\Cursors\5EQ15.rt | Virus.Boot-DOS.V.1536 |
| ☐ C:\WINDOWS\Downloaded Program Files\08n85E5D.cab | Macro.PPoint.ShapeShift |
| ☐ C:\WINDOWS\Help\CWu78264D.sys | Backdoor.Perl.AEI.16 |
| ☐ C:\WINDOWS\Help\Tours\WindowsMediaPL...\F67J2fEQa.c | Trojan-SMS.J2ME.RedBrows |
| ☐ C:\WINDOWS\Help\Tours\WindowsMed...\454uU7CQBC2.y | Trojan-Clicker.Win32.Stixo.d |
| ☐ C:\WINDOWS\Java\CHTIME\Applets\4A16Hw3UHW.dl | Trojan-Proxy.Win32.Agent.q |
| ☐ C:\WINDOWS\time\imeipA06A2dn8m.dl | Trojan-Downloader.BAT.Ftp. |
| ☐ C:\WINDOWS\time\imeimeip98\\.cab | Trojan-SMS.SymbOS.Viver.a |
| ☐ C:\WINDOWS\Installer\8jTgcQW6F.ne | Backdoor.Rbot.gen |

Scan Process: 100%    Infections found: 32    Remove All 44

Help Information 40

Activate your copy right now and get full real-time protection with XP AntiMalware 2010! 52

Purchase Information 50

⊗ Virus intrusion! 22
Your computer security is at risk. Spyware, worms and Trojans were detected in the background. Prevent data corruption and credit card information theft. Safeguard your system and perform a free security scan now.

Virus Information 20

FIG. 2

Keyword Database

FIG. 3

```
<Rule operation="And" description="AV vendor information +
Malware name + AV utility function">
    <Rule keywords="AV vendor information"/>
    <Rule count="3" distinct="True" keywords="Malware Name"/>
    <Rule keywords="AV utility function"/>
</Rule>
```
— 310

```
<Rule operation="And" description="AV Vendor Information +
Balloon Tips Information + Malware Name">
    <Rule description="AV Vendor Information" keywords="AV
    Vendor Information"/>
    <Rule description="Balloon Tips Information" keywords="
    Balloon_Tips_Information"/>
    <Rule count="2" distinct="True" description="Malware Name"
    keywords="Malware Name"/>
</Rule>
```
— 320

```
<Rule operation="And" description="AV Vendor Information +
AVLike Clean Function = Balloon Tips Information + Malware Name +
AV Utility Function">
    <Rule description="AV Vendor Information" keywords="AV
    Vendor Information"/>
    <Rule description="Balloon Tips Information" keywords="
    Balloon_Tips_Information"/>
    <Rule description="Malware Name" keywords="Malware
    Name"/>
    <Rule description="AV Utility Function" keywords="AV Utility
    Function"/>
    <Rule description="AVLike Clean Function"
    keywords="AVLike_Clean_Function"/>
</Rule>
```
— 330

Rule Database

REMOVAL OF FAKE ANTI-VIRUS SOFTWARE

FIELD OF THE INVENTION

The present invention relates generally to detection and removal of malicious software on a computer. More specifically, the present invention relates to detection of fake antivirus software.

BACKGROUND OF THE INVENTION

In recent years, with the growth of malicious software and corresponding efforts to combat this malicious software with antivirus software, a new type of malicious software has emerged. This malicious software masquerades as real antivirus software and is often referred to as fake antivirus software, as rogue software or as "scareware."

This fake antivirus software tricks a computer user into thinking that real antivirus software is present on his or her computer and that hitherto unknown malicious software has been detected by the fake software. The fake software may then deceive the user into purchasing an improved version of the fake software, into paying for the removal of malicious software which does not exist and will not be removed, or into installing other malicious software. Fake antivirus software has become a growing and very serious security issue with desktop computing in general.

The fake antivirus software usually relies upon some type of trick in order to get around installed antivirus software and to install itself onto the user's computer. For example, a malicious Web site may display a fictitious warning that the computer has been infected and encourage the user to purchase or install other fake software. Or, a user may be misled into installing a Trojan through a browser plug-in, through an attachment to an e-mail message, via shared software, via infected URLs in a search result, or via a fictitious online malware scanning service. Some fake antivirus software may not require any user action and instead installs itself via a download that exploits security vulnerabilities in the user's computer software.

Once installed, the fake antivirus software attempts to convince the user to pay a fee, purchase additional software, install more software, or generally take an action that is not necessary and is usually detrimental to the computer or its user.

It can be difficult to detect and remove such fake antivirus software. A traditional file scanner is used to detect malicious software in general, but such a file scanner may not be able to detect fake antivirus software. The fake software uses a customized packer and may change its user interface layout periodically. Further, it may also add trash information to its file contents, all to avoid detection by file scanner. A behavior monitor of antivirus software also may have difficulty in detecting fake antivirus software. Because the behavior of fake antivirus software can be very similar to that of a normal software application the behavior monitor may not be able to detect the fake software. For example, the fake software may simply present a pleasant-looking graphical user interface that convinces the user to connect to a malicious Web site in order to purchase the fake software.

For these reasons, it is believed that current scanning and monitoring techniques are not extremely useful in detecting and removing fake antivirus software. Accordingly, new techniques are desired.

SUMMARY OF THE INVENTION

To achieve the foregoing, and in accordance with the purpose of the present invention, a technique is disclosed that detects and removes fake antivirus software.

Lists of keywords are collected that are typically associated with fake antivirus software. One more rules are developed including the keywords that likely indicate fake antivirus software when matched with a process on a computer. The keywords and rules may be stored in a local database on the computer.

In one embodiment, each executing process or selected executing processes of a computer are scanned using one or more of the rules. A match indicates that it is possible that the scanned process is fake antivirus software. A check is then performed to determine if the scanned process is actually legitimate antivirus software. The check may be performed using a digital certificate associated with the process, any suitable white list, or a call to a function. If the check fails then a determination is made that the identified process is fake antivirus software; the process may then be displayed, cleaned, quarantined, or permanently removed from the computer.

In other embodiments all executing processes on a computer may be scanned using one or more of the rules. Or, the cursor may be dragged into the window of an executing process in order to selectively scan that process only. Or, any number of executing processes may be selected to be scanned by the rules. A log function allows a computer user to view a history of actions taken by the above technique.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

It is realized that once fake antivirus software is installed, it often uses similar ploys in order to coax a computer user into making a purchase. It has also been realized that the fake software may also present a fake installation page and show a fake installation process (or may actually be installing for real, even though it is not real antivirus software).

For example, the fake software may alert the user with a simulated detection of malware or pornography, usually taking the form of a new window opened on the computer display that resembles the user interface for real antivirus software. In addition, the fake software may display a simulated crash and reboot, or may install actual malware onto the computer (or change system registries) and then alert the user that the newly-installed malware has been "detected" by the fake software. The fake software may also display a variety of pop-up windows such as a dialog box explaining how to fix the computer's problem that the user can click on, or a warning or security alert that may appear very similar to actual such alerts. Other types of social engineering tricks may also be used by the fake antivirus software.

More specifically, it has been realized that in order for the fake antivirus software to deceive or mislead the user into making an unneeded payment, that the fake software needs to convince the computer user that his or her computer has been infected by malware and that there is an urgent need to purchase fake antivirus software, pay a fee, or take some other unnecessary action. An analysis of many thousands of fake antivirus samples has revealed that fake antivirus software uses certain methods and provides certain information consistently.

For one, the fake software first informs the user that his or her computer has been infected by malware and often displays the type of malware present such as a Trojan, spyware, downloader, virus, worm, spam, adware, etc. At the same time, the fake software states or shows that the fake software is legitimate antivirus software by displaying fictitious antivirus vendor information such as "Defender," "Antivirus Doctor," "Anti-malware," "PC Security," etc. And then, the fake software informs the user that it can help solve the problem. Usually the fake software attempts to convince the user that can handle the situation by using wording such as "scan result," "threats found," "clean," "remove," "quarantine," "total scan," "infections found," "spam blocked," etc. Finally, the fake software informs the user that he or she must make a purchase, buy a license to activate the fake software, register the software, etc., usually presented in a window or Web page designed to facilitate taking the user's money.

Fake Antivirus Software Example

Figure 1:
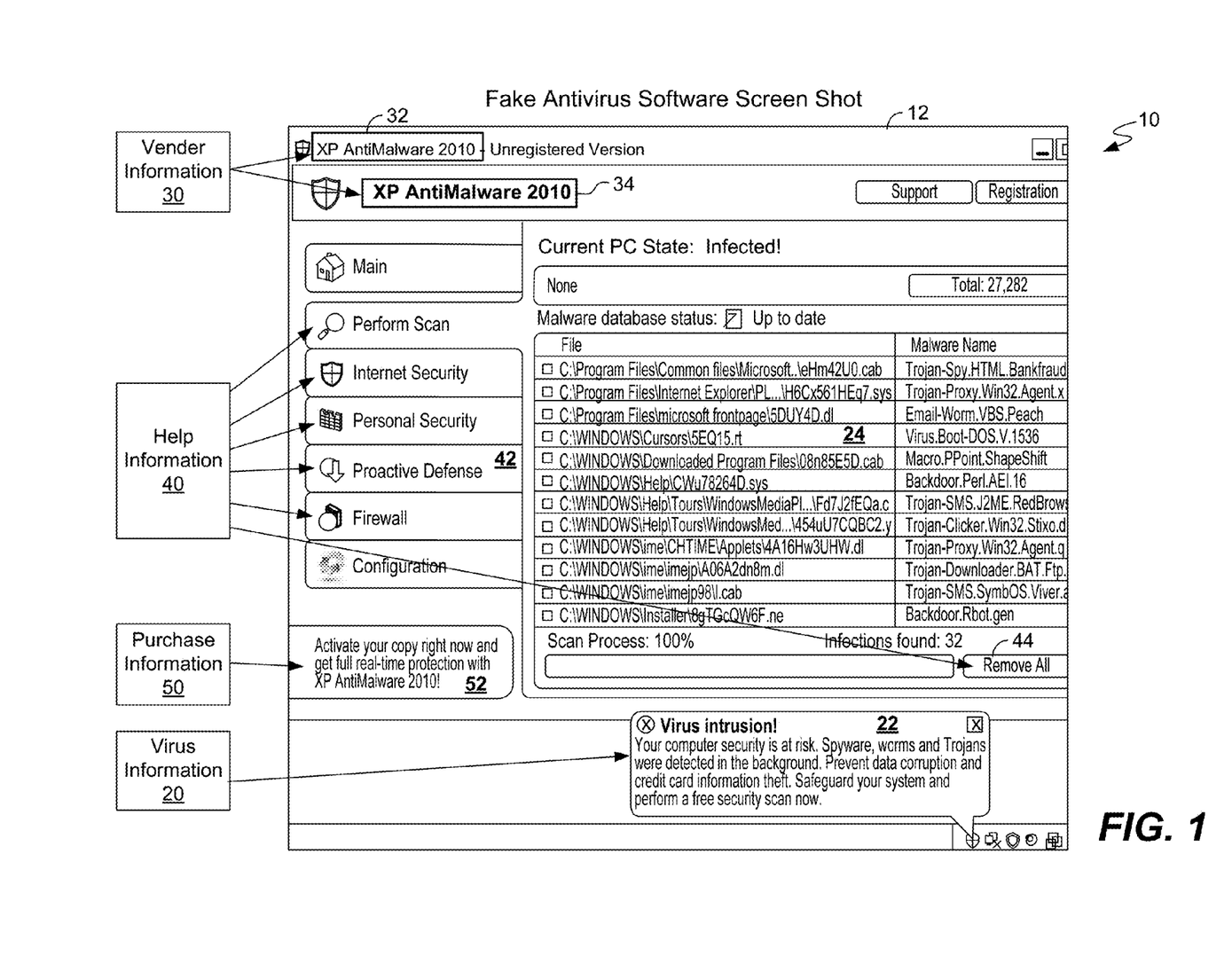
FIG. 1 illustrates a screen shot 10 of a typical fake antivirus software program.

FIG. 1 illustrates a screen shot 10 of a typical fake antivirus software program. The fake software is present on the user's computer and has presented on the computer's display a window 12 that provides fictitious information. As explained above, certain types of information are consistently presented by fake antivirus software. Virus information 20 is presented to convince the user that his or her computer has been infected by malware. For example, warning box 22 informs the user that malware has been detected and that the user should take action. Region 24 includes a list of fictitious malware programs and their locations that have supposedly been detected on the user's computer. Also provided is a state of "Infected!," and an indication that a scan has been performed and that infections have been found.

Fictitious Vendor Information 30 is also presented to make the user feel as if a legitimate security organization is behind the fake software. Shown are two blocks 32 and 34 with a fictitious company name that sounds legitimate, along with an illustration of a shield. In addition, Help Information 40 is presented to convince the user that the fake software is able to help the user fix problems and generally assist with computer security. For example, tab 42 "Proactive Defense" purports to provide some type of defense, while button 44 pretends that all of the alleged malware can be removed by clicking on a button. Finally, Purchase Information 50 tells the user that he or she must spend money in order to solve the problem. Shown is a region 52 asking the user to activate in order to obtain full protection. Once the user clicks upon this region they will be presented with a new window, a dialog box or a link to a Web page in which the user is asked for payment information.

In general, it is realized that if a process on a computer contains names of malware, some sort of vendor information, an antivirus utility, suspicious system tray tips, and registration information (or some combination of the preceding), then it may be determined that this process is likely to be fake antivirus software.

Flow Diagram

Figure 2:
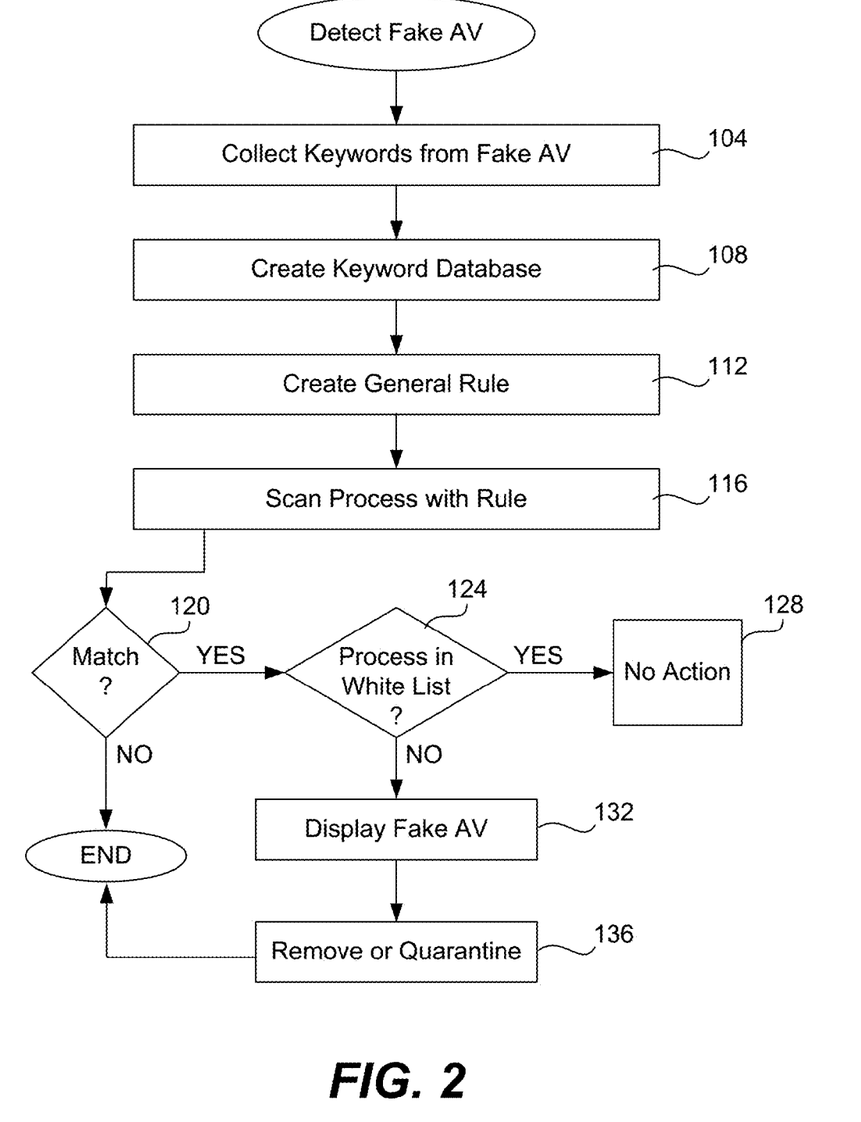
FIG. 2 is an example flow diagram describing one embodiment for detecting fake antivirus software.

FIG. 2 is an example flow diagram describing one embodiment for detecting fake antivirus software. In step 104 any types and number of keywords are collected that characterize fake antivirus software. Preferably, these are keywords that fake antivirus software often uses and thus, detection of these keywords in a process on a computer may lead to the conclusion that fake antivirus software is present. For example, FIG. 1 shows examples of keywords for Virus Information that are found in window 22 such as "spyware," "worms" and "Trojans." Regions 32 and 34 include keywords for Vendor Information, regions 42 and 44 include keywords for Help Information, and region 52 includes keywords for Purchase Information.

These keywords may be collected in a variety of manners. In one embodiment, any number of fake antivirus software samples may be reviewed manually to collect this keyword information. Alternatively, the executing samples may be scanned automatically in memory by computer software in order to detect the information. In one specific embodiment, a memory dump is performed while the fake software is executing and the data in this memory is then scanned, keywords are retrieved, and a statistical analysis is performed to determine the most common keywords used and their types. These steps are performed on a large number of fake antivirus programs, such as thousands.

Keywords may also be collected by monitoring the system behavior of the fake software. For example, fake software might drop a file "Security Shield.lnk" or write a to registry "HKCU\Software\Microsoft\Windows\CurrentVersion\Run: XP Antivirus." In this case, "Security Shield" and "XP Antivirus" would be the keywords. We can also use optical character recognition software to collect keywords from dropped images, screen shots, etc. For example, computer screen wallpaper dropped by fake software may contain many keywords that are collected via OCR.

Figure 3:
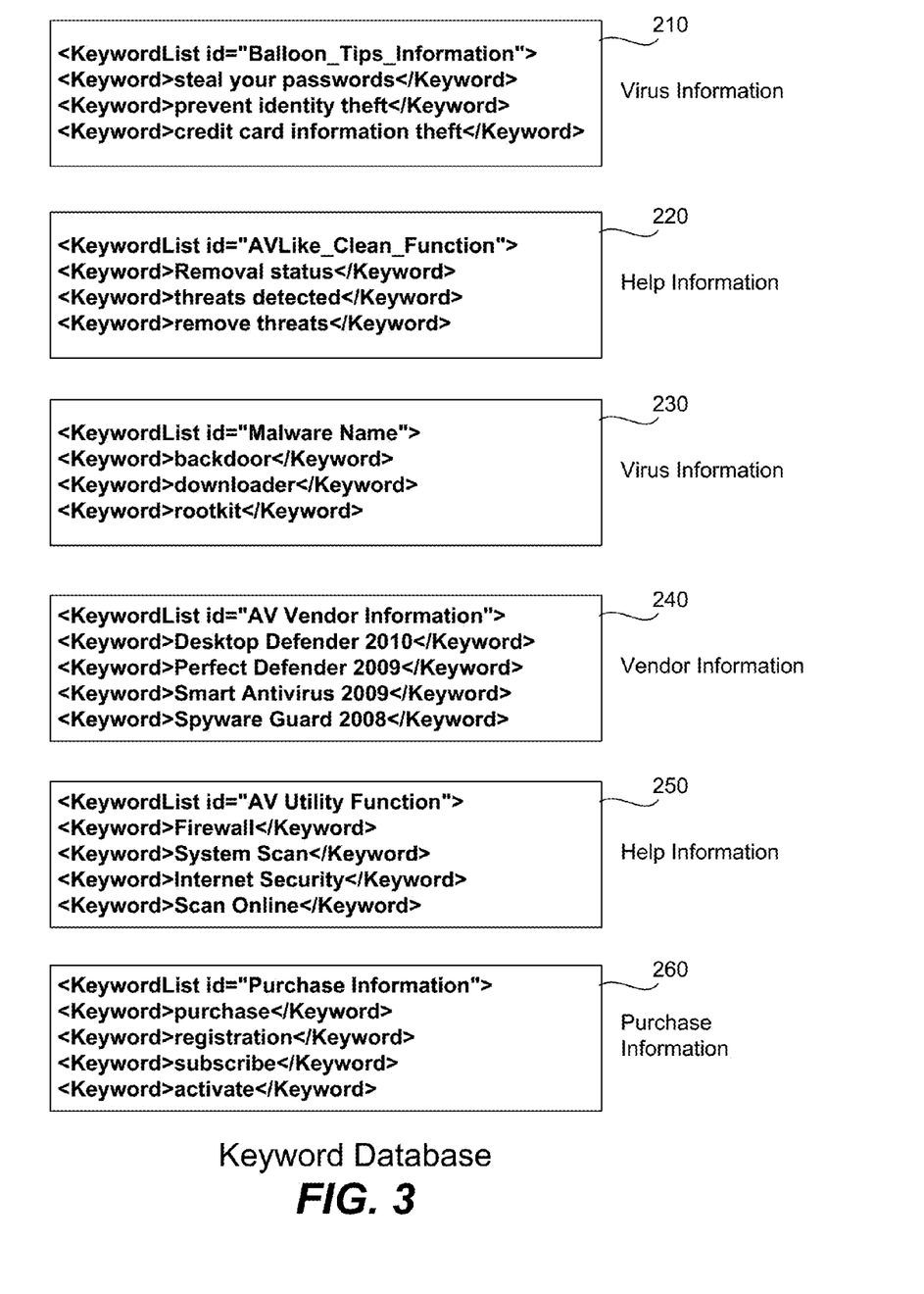
FIG. 3 shows example records from one embodiment of a keyword database.
Figure 4:
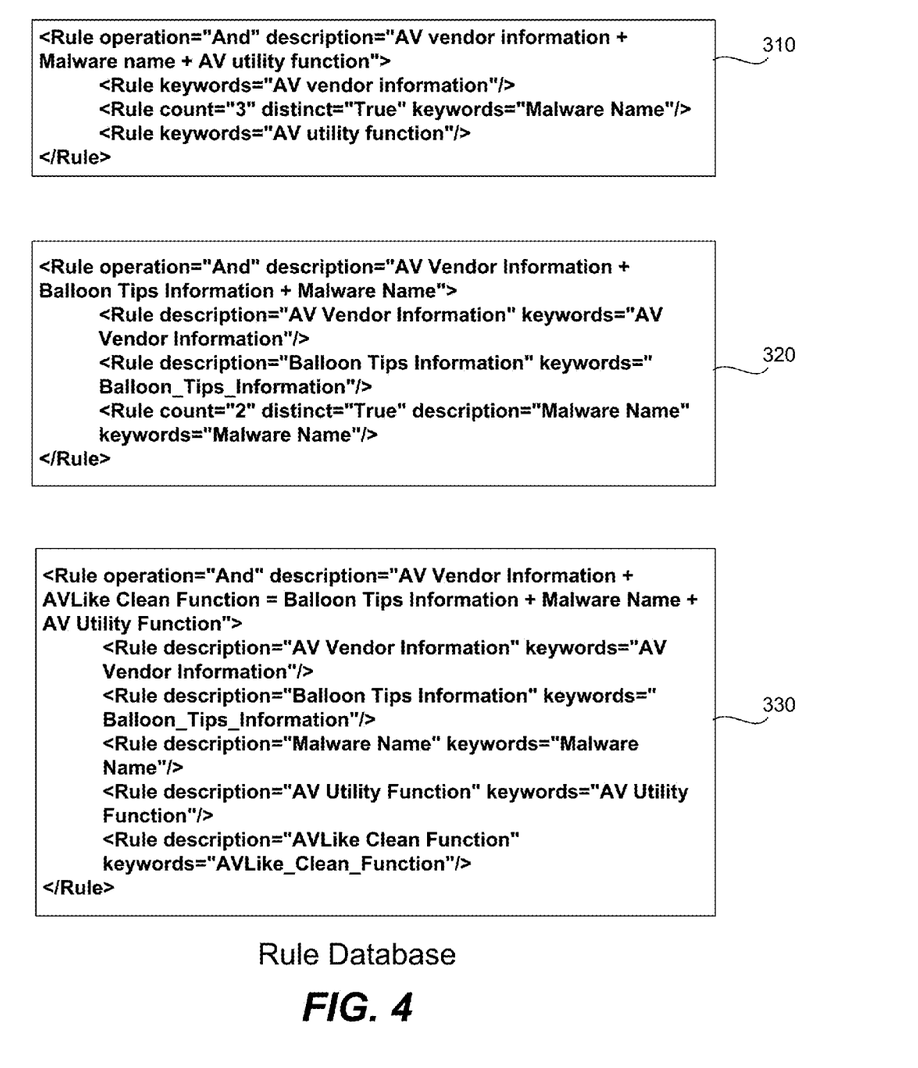
FIG. 4 lists example rules from one embodiment of a rule database.

Once these keywords are collected, then in step number 108 a keyword database may be built for use in a rule. Examples of records in a keyword database are shown in FIG. 3. This keyword database may be stored in any suitable location in a computer system and using any suitable database software. A general rule or rules may also be created in step 112 that can be used by a scan engine to detect antivirus software. Examples of rules are shown in FIG. 4.

In step 116 a process or processes in the computer may be scanned with any of the rules created. This step may scan all processes in the memory of a computer using the created rule, may scan only selected processes that the user has chosen from a process list, or may scan a selected process by dragging the cursor into a program's window. In embodiment, removal software for fake antivirus software scans processes that are executing in memory of the computer and compares data from these processes with the rule being used. Because fake antivirus software is often encrypted when stored on disk, it may not be possible to scan a disk for fake antivirus software.

If a process in memory does not match the rule being scanned, then the flow may end. Of course, if more than one process is being scanned then each process will be scanned in turn by the rule and a determination is made in step 120 whether or not a match has occurred. If the rule does match one of the scanned processes, then a determination is made in step 120 that this process is likely to be antivirus software (legitimate or fake). It is not necessary that a process match all keywords of a particular keyword list in a record in order for a match to be declared. It may be sufficient for the process to match a subset of the keywords or certain important keywords as described in the rule in order for there to be a match.

At this point in time it is not known for certain whether the process is actually fake antivirus software, because it is possible that a legitimate antivirus software program has matched the rule.

Accordingly, in step number 124 a determination is made as to whether or not the process is actually legitimate antivirus software. Such a determination may be made in a variety of ways. In general, normal antivirus software should exist in a white list, should exist in some other type of verified list, or should be able to be verified by some other means. In one specific embodiment, a check is made as to whether the matched process (or its file) has been digitally signed by the appropriate authority. As known in the art, a cryptographic digital signature may be used to sign a particular computer file with a digital certificate and it may be verified that the signing authority is legitimate. For example, the certificate may be issued by a legitimate antivirus software vendor, by Microsoft Corporation, by VeriSign, etc. Typically, fake antivirus software will not be signed, or will have a fake digital certificate that is invalid.

In other embodiments, other types of white lists may be checked such as the Normal File Bank (NFB), the Resource Control List (RCL), the Good Company List (GCL), or file protection whites lists of a Microsoft operating system. The Normal File Bank is an internal white list database created by Trend Micro Inc. that may also be implemented as a software product. This file bank lists digital signatures of files or processes that are known to be legitimate. A check is performed of the matched process by calculating the digital signature of the file (such as its MD5) and sending the signature to the file bank white list. Similarly, the Good Company List GCL is an internal database containing the names of all legitimate antivirus vendors. A check is performed by retrieving the name of the supposed antivirus software vendor from the process in question (if any) and checking this name against the GCL.

The Resource Control List is a list of legitimate company names maintained globally by the industry. A check is performed by obtaining the name of the company from the matched process (if any) and sending this name over an Internet connection to be checked by the Resource Control List. The check may also be used to determine if the process is legitimate by using file protection of a Microsoft operating system. A check is performed by making a call to a Microsoft API with the name of the process. The result indicates whether or not the process and/or file has legitimately originated with Microsoft Corporation.

If it is determined in step 124 that the process is legitimate (using any of the above verification techniques) then no action need be taken since it is likely that the process is not fake antivirus software. On the other hand, if step 124 determines that the process is not legitimate (perhaps because the certificate is invalid, or the company name or process is not on a white list), then a conclusion may be reached that the process is in fact fake antivirus software. Therefore, in step 132 the results may be displayed on the user's computer indicating that this process is fake software. All processes that have been determined to be fake software may be displayed. In step 136 the user is given the option of cleaning or removing this fake software. Alternatively, detected fake software may be removed automatically upon detection. In addition, while the computer may be cleaned of the fake software, the fake software may be placed into a quarantine area of the computer such that while the software cannot harm the computer, it may be retrieved by the user at a later time. This may be desirable if there has been a false positive and it is desired to restore software that had previously been determined to be fake antivirus software.

Example Databases

FIG. 3 shows example records from one embodiment of a keyword database. Of course, such a database may be up implemented in a variety of ways and may take different forms and use different syntax. For example, record 210 lists keywords associated with Balloon Tips Information such as "prevent identity theft" that can be used to identify balloon tips that are associated with fake software. This record is an example of Virus Information that fake software uses to catch the user's attention and to convince the user that malware has infected his or her computer (even though that is not the case).

Record 230 lists keywords associated with malware names such as "rootkit." These malware names may be used to identify potential fake antivirus software as well. These malware names are also examples of Virus Information. Because these are well-known names of types of malicious software, fake software uses these names to convince the user that his or her computer has been infected.

Record 220 lists keywords associated with an Antivirus-like cleaning function such as "threats detected" and "remove threats" that can be used to identify fake software. These keywords are examples of Help Information that fake software uses to try and convince the user that it is legitimate software and is capable of removing or cleaning malicious software. Record 250 lists keywords associated with an antivirus Utility Function. These keywords are also examples of Help Information to convince the user that the fake software is legitimate and is able to help the user perform any of a number of computer security functions such as "Firewall" or "Perform Scan."

Record 240 lists keywords associated with antivirus Vendor Information. These are keywords used by fake antivirus software to convince the user that the software actually comes from a legitimate antivirus vendor, when in fact it does not. For example, a keyword such as "Spyware Guard 2008" looks like a reasonable name for legitimate software. It can be common for fake software to use certain of these keywords also in conjunction with a current year. Record 260 lists keywords associated with Purchase Information such as "purchase" or "subscribe." Fake software uses these keywords in order to convince the user that he or she must make a payment in order to be protected.

FIG. 4 lists example rules from one embodiment of a rule database. Of course, a rule may be up implemented using any appropriate rule syntax and may be stored in any suitable database. Shown are three example rules 310, 320 and 330 which rely upon the keyword database from FIG. 3. Typically, a single rule is used to scan processes within a computer system, although it is possible to scan using more than one rule and to reconcile the results, or to scan using different rules at different times.

Rule 310 relies upon vendor information, malware names (virus information) and utility functions (help information). Rule will 310 will match a particular process when scanned if there is at least one keyword from the vendor information, at least one keyword from the utility functions, and if there are three different malware names present in the scanned process.

Rule 320 relies upon vendor information, balloon tips information and malware names (virus information). This rule will match with a scanned process when at least one keyword from vendor information is found, when at least one keyword from balloon tips information is found, and when there are at least two different malware names found in the scanned process.

Rule 330 relies upon vendor information, cleaning functions and utility functions (help information), and balloon tips information and malware names (virus information). This rule will match with a scanned process when at least one keyword from vendor information is found, when at least one keyword from balloon tips information is found, when at least one keyword from malware names is found, when at least one utility function is found, and when at least one cleaning function is found in the scanned process.

Specific Embodiment

The present invention may be implemented in a variety of forms. In one specific embodiment, the present invention may be implemented as an antivirus software tool having a series of graphical display screens with which a computer user may interact. The following figures present this embodiment.

Figure 5:
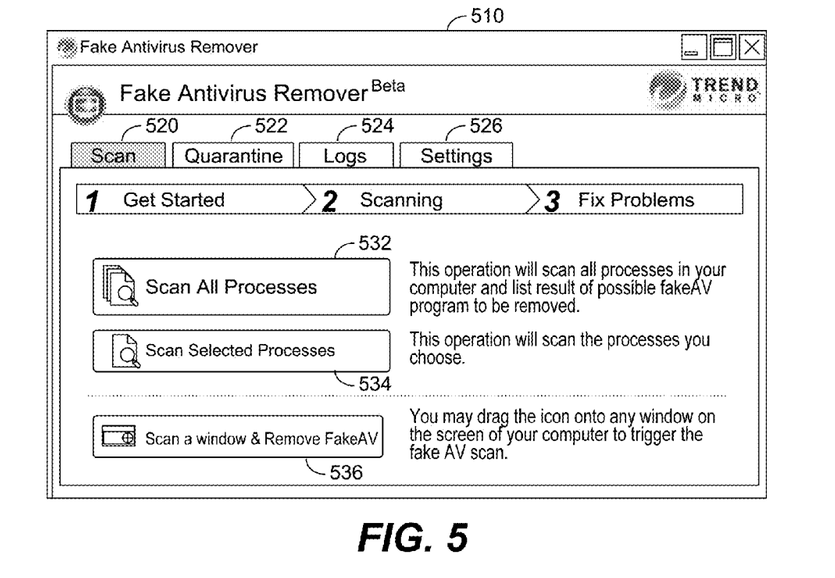
FIG. 5 is a screen shot of an initial window 510 of a software tool for removing fake antivirus software.

FIG. 5 is a screen shot of an initial window 510 of a software tool for removing fake antivirus software. The tool includes numerous tabs for performing various functions. Tab 520 allows a user to select different types of scanning for his or her computer. Tab 522 allows a user to access quarantined files. Tab 524 allows a user to display previous scan results. Tab 526 allows a user to change the settings of the tool. For example, the user may click tab 526 in order to: download the latest pattern for use within the tool, report a suggestion, download the latest version of the tool engine, download the latest configuration pattern, download the latest white list pattern, or automatically download all new updates.

By choosing the scan tab 520 the user may choose from different types of scans 532, 534 and 536. Button 532 allows the user to scan all executing processes in the computer system as well as checking if there is a specific file, a specific registry or a specific mutex in the system. Checking a specific file or a specific registry here means checking if a file name or registry or registry key/value contains keywords of fake software. For example, a process's image name is "xp_antivirus.exe" that contains the keywords "XP" and "Antivirus." The registry "HKCU\Software\Microsoft\Windows\CurrentVersion\Run:XP Antivirus" also contains the keywords "XP" and "Antivirus."

Button 534 allows the user to scan only selected processes from a process list. This type of scan would not include checking a specific file, a specific registry or a specific mutex. Button 536 allows user to drag the screen cursor onto a program's window in order to trigger scanning of that program. This technique is similar to how one drags and drops a Word document file into a Microsoft Word program in order to open the file. After the user clicks the "Scan Selected Process" button, the user holds the left mouse button on a popup cursor (e.g., a red cross) and drags and drops the popup cursor on the window of the fake software in order to scan that process. After the scanning completes, a list of possible fake antivirus software will be displayed and may be removed by the user.

Figure 6:
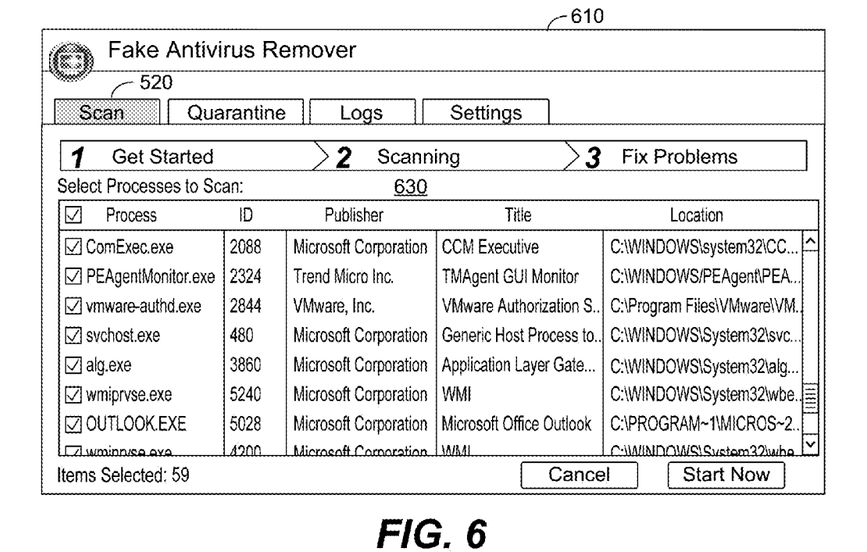
FIG. 6 is a screen shot of a window 610 displaying currently executing processes that a user may select to scan.

FIG. 6 is a screen shot of a window 610 displaying currently executing processes that a user may select to scan. The user has selected scan tab 520 and then selected button 534. The tool displays a window 630 listing all eligible processes that a user may select to be scanned for detection of fake antivirus software. Shown is a column listing the name of each executable process, a column listing the process identifier, a publisher column, a title column, and a final column listing the location of each executable process within the computer system. The user may select a checkbox to the left of each process in order to select that process for scanning. In this example, the user has selected all shown processes.

Figure 7:
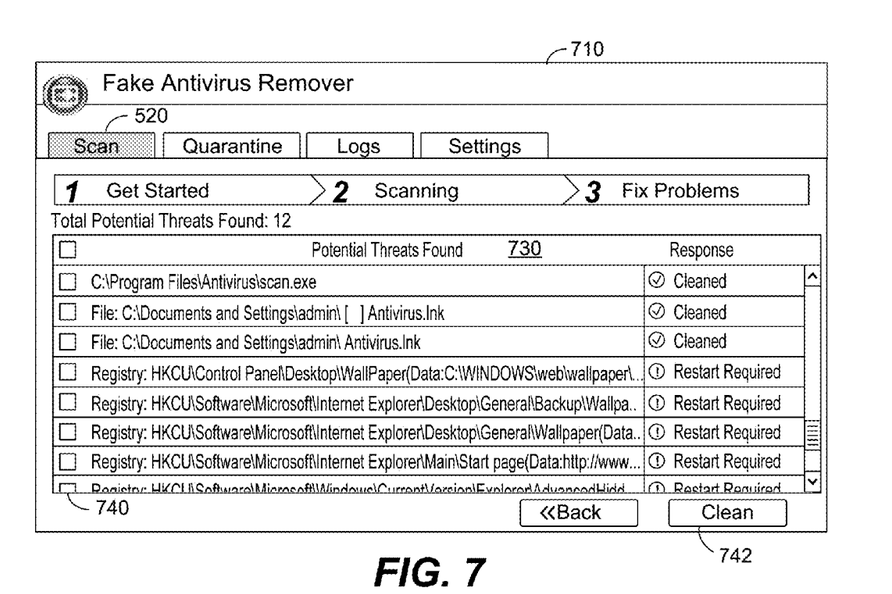
FIG. 7 is a screen shot of a window 710 displaying the results of a scan.

FIG. 7 is a screen shot of a window 710 displaying the results of a scan. The tool displays a window 730 that lists row-by-row each potential fake antivirus software program or registry entry. Shown is the location of each executable process, file or registry setting that has been identified, along with a potential response. In this example 12 potential threats have been found. The user may check a box in column 740 and press the "clean" button 742 in order to remove the potential threat from the computer system. In this example the first three potential threats have been removed, while a restart is required for the remaining threats. A restart may be required because, in the case of registry entries, the registry information may currently be in use by another legitimate process. Links and shortcuts may also be provided in this list if they represent fake antivirus software. For example, the second entry in the list, "Antivirus.lnk," is a shortcut to fake software that has also been removed.

Of course, the user may elect not to take any action with respect to a particular threat. In one embodiment, when clean button 742 is clicked and a process, shortcut, file or registry entry is removed, it is actually placed into a quarantined area on disk such that the item is no longer available for use. The fake antivirus software that has been removed and placed into the quarantined area can no longer adversely affect the computer system but it still is available to be restored to the computer system if necessary. In one embodiment, the quarantined area is a hidden folder unknown to the user that is only used by the fake antivirus software removal tool.

Figure 8:
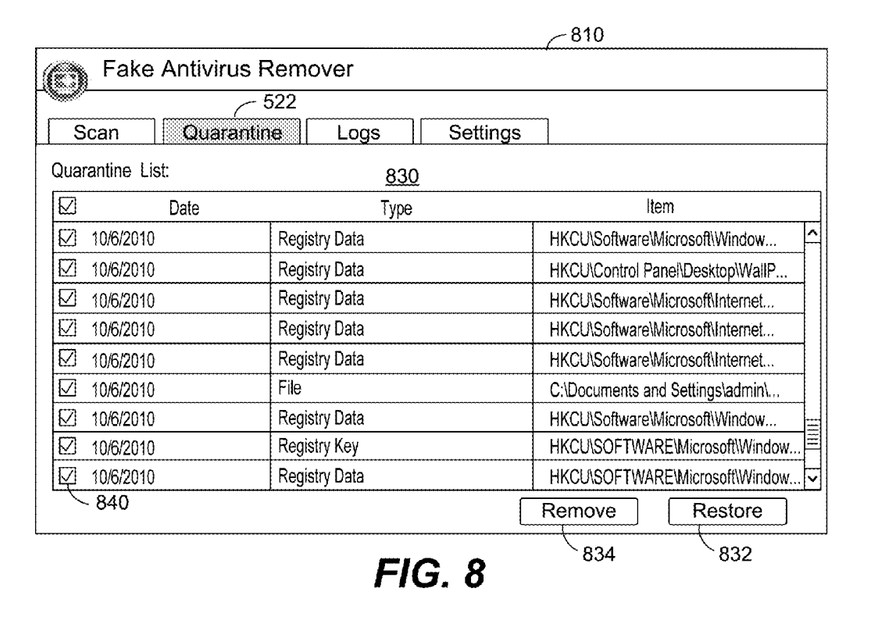
FIG. 8 is a screen shot of a window 810 displaying the quarantine function.

FIG. 8 is a screen shot of a window 810 displaying the quarantine function. It is possible that the fake antivirus software tool might detect a false positive and remove a legitimate process, file or registry entry. In this situation, it is possible to restore such a process, file or registry entry by selecting quarantine tab 522. Once selected, display window 830 lists row-by-row each process, file or registry entry that has previously been removed by the tool. Shown is a first column listing the date when the item was removed, a second column listing the type of the item, and a final column identifying the location of the item within the computer system. By selecting a checkbox within column 840 and then clicking restore button 838 a particular item will be restored to the computer system and would be available for use. Button 834 may also be clicked in order to permanently remove the item from the computer system.

Figure 9:
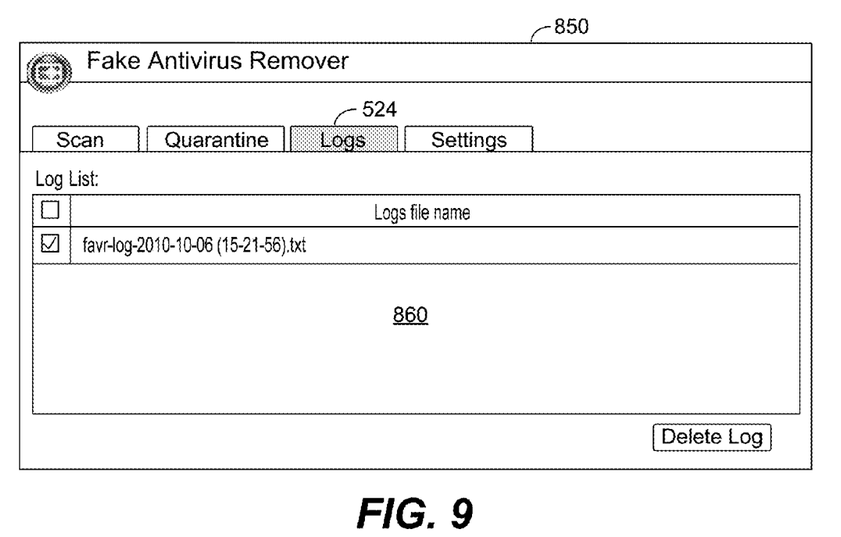
FIG. 9 is a screen shot of a window 850 displaying the log function.

FIG. 9 is a screen shot of a window 850 displaying the log function. Should the user wish to review the results of a previous scan on a particular date, he or she may click on tab 524. Once clicked, window 860 then displays all previous results by date. In this example, shown is a log from a previous scan performed on Oct. 6, 2010. The log may be deleted or may be displayed in more detail is shown in the next figure.

Figure 10:
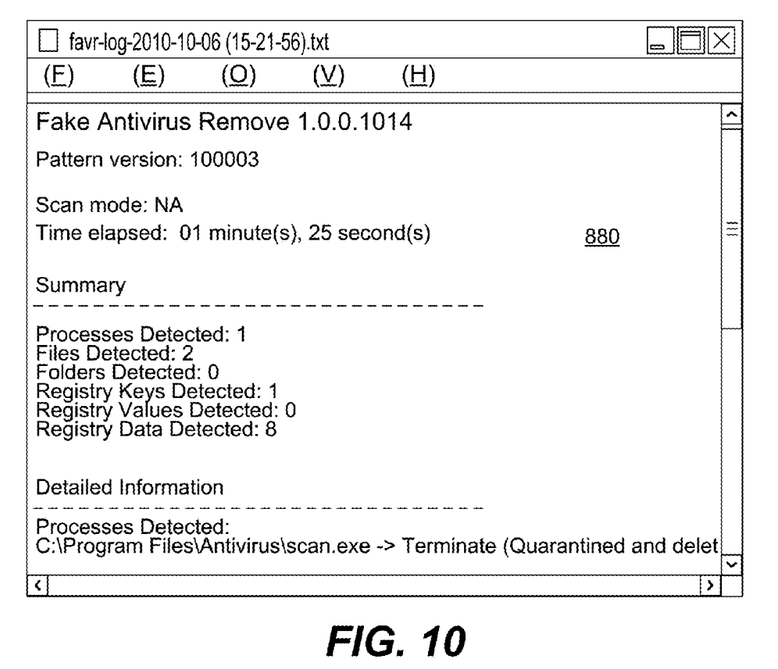
FIG. 10 is a screen shot of a window 880 showing the detailed results of a particular log.

FIG. 10 is a screen shot of a window 880 showing the detailed results of a particular log. Shown in order in the log is the version number of the fake antivirus removal software, the pattern version used by the tool, and a summary. The summary lists the number of suspicious processes, files, folders or registry entries that have been detected. More detailed information follows that includes the precise location of the detected item and the action taken by the user on that date such as terminated, quarantined, removed completely from the computer system, no action taken, etc.

Computer System Embodiment

Figure 11A:
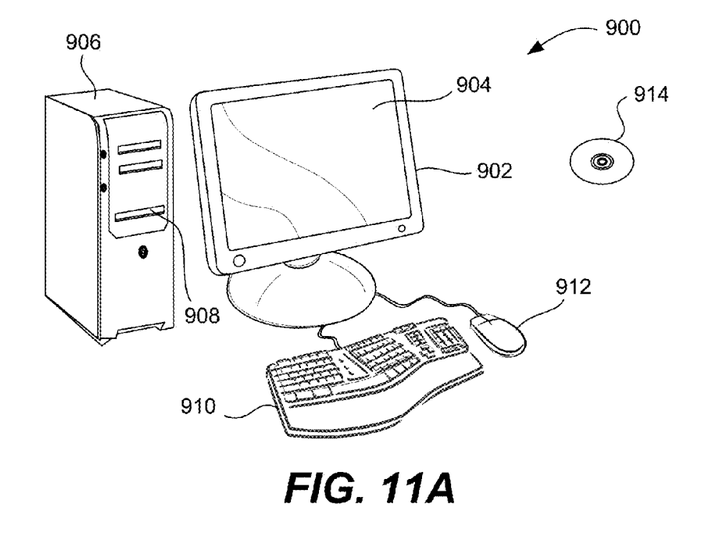
FIGS. 11A and 11B illustrate a computer system suitable for implementing embodiments of the present invention.
Figure 11B:
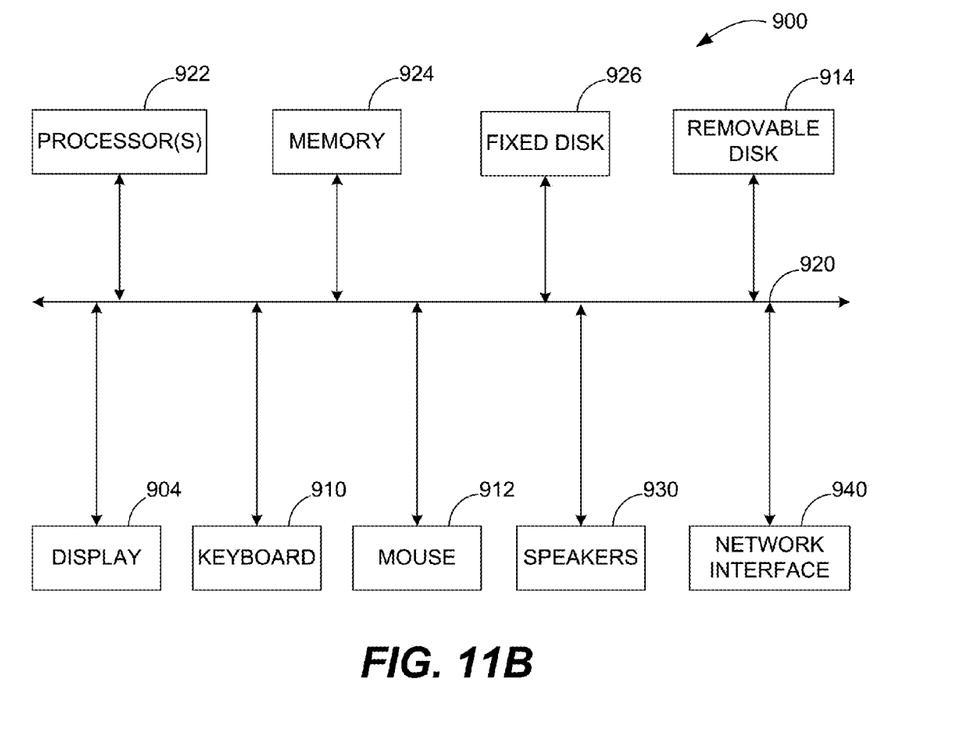

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting fake antivirus software, said method comprising:
    collecting keywords that are comprehensible words by scanning a plurality of executing fake antivirus software samples in a second memory of a second computer and storing said keywords in a keyword database;
    identifying an executing process in a computer;
    retrieving a rule from a rule database, said rule using two or more of said keywords to identify fake software;
    retrieving said keywords from said keyword database, each of said keywords being indicative of fake antivirus software;
    applying said rule to said executing process and determining that said keywords of said rule match data in said process executing in a memory of said computer by scanning said process in said memory;
    determining, after said step of applying, that said process is not a legitimate process when a digital certificate of said process is nonexistent or is invalid, when an identification of said process does not exist in a white list of valid processes, or when a company name associated with said process does not exist in a white list of valid company names; and
    displaying, on said computer, an indication that said process is fake antivirus software based on said applying and said determining.

2. The method as recited in claim 1 further comprising:
    cleaning said process from said computer by placing a file corresponding to said process into a folder not accessible by a user of said computer.

3. The method as recited in claim 2 comprising:
    restoring said file by moving said file from said non-accessible folder back to an original location of said file.

4. The method as recited in claim 1 further comprising:
    cleaning said process from said computer by permanently removing a file associated with said process from said computer.

5. The method as recited in claim 1 further comprising:
    performing a memory dump of said memory; and
    scanning said memory dump in order to perform said determining of whether said keywords in said rule match said data.

6. The method as recited in claim 1 wherein said keyword database exists on said computer.

7. The method as recited in claim 1 further comprising:
identifying a plurality of executing processes in said computer; and
applying said rule to said executing processes by scanning said processes in said memory.

8. The method as recited in claim 1 further comprising:
scanning said process in said memory without scanning a memory dedicated to display of said process.

9. A method as recited in claim 1 further comprising:
using statistical analysis to determine the most common keywords to be stored in said keyword database.

10. A method of detecting fake antivirus software, said method comprising:
collecting keywords that are comprehensible words by scanning memory dumps of a plurality of executing fake antivirus software samples and storing said keywords in a keyword database;
identifying an executing process in a computer;
retrieving a rule from a rule database, said rule using two or more of said keywords to identify fake software;
retrieving said keywords from said keyword database, each of said keywords being indicative of fake antivirus software;
applying said rule to said executing process and determining that keywords of said rule match data in said process executing in a memory of said computer by scanning said process in said memory;
determining, after said step of applying, that said process is legitimate antivirus software when a digital certificate of said process is valid, when an identification of said process does exist in a white list of valid processes, or when a company name associated with said process does exist in a white list of valid company names; and
displaying, on said computer, an indication that said process is legitimate antivirus software based on said applying and said determining.

11. The method as recited in claim 10 wherein said step of displaying indicates that said process is legitimate antivirus software by not displaying any information concerning said process.

12. The method as recited in claim 10 wherein said step of displaying indicates that said process is legitimate antivirus software by displaying a name of said process and a notice that said process is legitimate.

13. The method as recited in claim 10 further comprising:
performing a memory dump of said memory; and
scanning said memory dump in order to perform said determining of whether said keywords in said rule match said data.

14. The method as recited in claim 10 wherein said keyword database exists on said computer.

15. A method as recited in claim 10 further comprising:
using statistical analysis to determine the most common keywords to be stored in said keyword database.

16. A method of detecting fake antivirus software, said method comprising:
collecting keywords that are comprehensible words by monitoring system behavior of a plurality of executing fake antivirus software samples and storing said keywords in a keyword database;
identifying an executing process in a computer, said process being legitimate antivirus software;
retrieving a rule from a rule database, said rule using two or more of said keywords to identify fake software;
retrieving said keywords from said keyword database, each of said keywords being indicative of fake antivirus software;
applying said rule to said executing process and determining that keywords of said rule match data in said process executing in a memory of said computer by scanning said process in said memory;
determining, after said step of applying, that said process is not legitimate antivirus software when a digital certificate of said process is nonexistent or is invalid, when an identification of said process does not exist in a white list of valid processes, or when a company name associated with said process does not exist in a white list of valid company names; and
displaying, on said computer, an indication that said process is fake antivirus software based on said applying and said determining.

17. The method as recited in claim 16 further comprising:
cleaning said process from said computer by placing a file corresponding to said process into a folder not accessible by a user of said computer.

18. The method as recited in claim 17 further comprising:
restoring said file by moving said file from said non-accessible folder back to an original location of said file.

19. The method as recited in claim 16 further comprising:
displaying, on said computer, registry information associated with said process; and
cleaning said registry information from said computer.

20. The method as recited in claim 16 further comprising:
performing a memory dump of said memory; and
scanning said memory dump in order to perform said determining of whether said keywords in said rule match said data.

21. The method as recited in claim 16 wherein said keyword database exists on said computer.

22. A method as recited in claim 16 further comprising:
using statistical analysis to determine the most common keywords to be stored in said keyword database.

23. A method of detecting fake antivirus software, said method comprising:
collecting keywords that are comprehensible words by using optical character recognition software on images dropped by a plurality of executing fake antivirus software samples and storing said keywords in a keyword database;
identifying an executing process in a computer;
retrieving a rule from a rule database, said rule using two or more of said keywords to identify fake software;
retrieving said keywords from said keyword database, each of said keywords being indicative of fake antivirus software;
applying said rule to said executing process and determining that said keywords of said rule match data in said process executing in a memory of said computer by scanning said process in said memory;
determining, after said step of applying, that said process is not a legitimate process when a digital certificate of said process is nonexistent or is invalid, when an identification of said process does not exist in a white list of valid processes, or when a company name associated with said process does not exist in a white list of valid company names; and
displaying, on said computer, an indication that said process is fake antivirus software based on said applying and said determining.

24. A method as recited in claim 23 further comprising:
using statistical analysis to determine the most common keywords to be stored in said keyword database.

* * * * *